US012612540B2

(12) United States Patent
Laborie et al.

(10) Patent No.: US 12,612,540 B2
(45) Date of Patent: Apr. 28, 2026

(54) TANNIN-BASED NON-ISOCYANATE POLYURETHANE ADHESIVES

(71) Applicant: Albert-Ludwigs-Universität Freiburg, Freiburg (DE)

(72) Inventors: Marie-Pierre Laborie, Bad Krozingen (DE); Gopakumar Sivasankarapillai, Freiburg (DE); Antonio Pizzi, Seignelay (FR)

(73) Assignee: Albert-Ludwigs-Universität Freiburg, Freiburg (DE)

( * ) Notice: Subject to any disclaimer, the term of this patent is extended or adjusted under 35 U.S.C. 154(b) by 55 days.

(21) Appl. No.: 18/694,072

(22) PCT Filed: Sep. 23, 2022

(86) PCT No.: PCT/EP2022/076529
§ 371 (c)(1),
(2) Date: Mar. 21, 2024

(87) PCT Pub. No.: WO2023/046903
PCT Pub. Date: Mar. 30, 2023

(65) Prior Publication Data

US 2024/0392174 A1 Nov. 28, 2024

(30) Foreign Application Priority Data

Sep. 24, 2021 (EP) .................................... 21198849

(51) Int. Cl.

| | |
|---|---|
| ***C09J 175/04*** | (2006.01) |
| ***C08G 71/04*** | (2006.01) |
| ***C09J 5/00*** | (2006.01) |

(52) U.S. Cl.
CPC ............ *C09J 175/04* (2013.01); *C08G 71/04* (2013.01); *C09J 5/00* (2013.01)

(58) Field of Classification Search
CPC .......... C09J 175/04; C09J 5/00; C09J 175/12; C08G 71/04; C08L 75/12
See application file for complete search history.

(56) References Cited

U.S. PATENT DOCUMENTS

| | | | | |
|---|---|---|---|---|
| 2013/0240114 A1* | 9/2013 | Balogh | C09J 161/12 525/503 |
| 2014/0238268 A1* | 8/2014 | Umemura | C08L 97/005 264/330 |

OTHER PUBLICATIONS

Chen et al, 'Preparation and Characterization of Condensed Tannin Non-Isocyanate Polyurethane (NIPU) Rigid Foams by Ambient Temperature Blowing', 2020, Polymers vol. 12 Issue 4 (Year: 2020).*
Aristri et al, 'Recent Developments in Lignin- and Tannin-Based Non-Isocyanate Polyurethane Resins for Wood Adhesives—A Review', 2021, Appl. Sci. vol. 11 Issue 9 pp. 4242 (Year: 2021).*
(Continued)

*Primary Examiner* — Michael N Orlando
*Assistant Examiner* — Abhishek A Patwardhan
(74) *Attorney, Agent, or Firm* — Agris & von Natzmer LLP; Joyce von Natzmer

(57) ABSTRACT

A process for the manufacture of a non-isocyanate polyurethane (NIPU) composition by transesterification of a condensed tannin with a carbonate or a carbonate precursor followed by the reaction with a hardener selected from diamines, triamines, polyamines and mixtures thereof and products and compositions obtained thereby.

8 Claims, 1 Drawing Sheet

(56) References Cited

OTHER PUBLICATIONS

Figure 1:
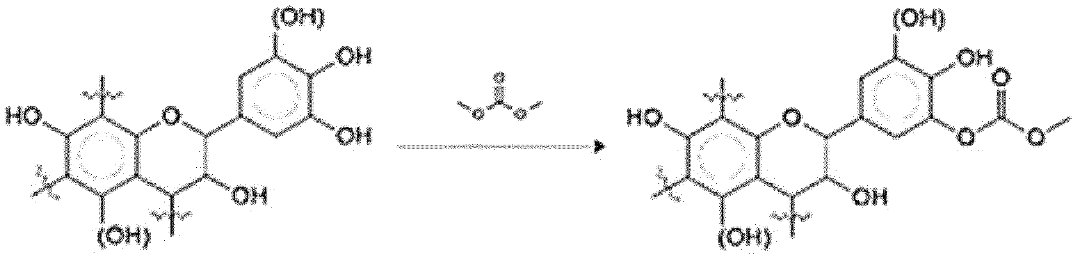

Pizzi, 'Tannin Based Biofoams—A Review', 2019, Journal of Renewable Materials, Tech Science Press, vol. 7 Issue 5 pp. 474-489 ( Year: 2019).*
Thébault Marion et al, "Isocyanate free condensed tannin-based polyurethanes", European Polymer Journal, Pergamon Press Ltd Oxford, GB, vol. 67, Nov. 11, 2014 (Nov. 11, 2014), p. 513-526.
European Patent Office acting as International Searching Authority, Written Opinion for PCT/EP2022/076529 (Mar. 30, 2023).

* cited by examiner

TANNIN-BASED NON-ISOCYANATE POLYURETHANE ADHESIVES

CROSS-REFERENCE TO RELATED APPLICATIONS

This is the U.S. national stage of international patent application no. PCT/EP2022/076529, filed Sep. 23, 2022 designating the United States and claiming priority to European patent application no. EP21198849.8, filed Sep. 24, 2021, which are incorporated herein by reference in their entireties.

The present invention relates to tannin-based non-isocyanate polyurethane adhesives. In particular, the invention relates to a process for the manufacture of a non-isocyanate polyurethane (NIPU) composition by transesterification of a condensed tannin with a carbonate or a carbonate precursor followed by the reaction with a hardener selected from diamines, triamines, polyamines or mixtures thereof, preferably diamines, particularly preferably aliphatic diamines, and products and compositions obtained thereby.

BACKGROUND OF THE INVENTION

Wood composites are a group of products which find increasing interest for a large variety of applications.

One important component of wood composites are the binders or adhesives which are used to hold them together. Formaldehyde is a key component in most of the adhesive resins used for the production of wood-based panels, which make up more than 50% by volume of all adhesives used in this field today. However, increasing public awareness and consumer demand for non-hazardous products, as well as the corresponding governmental regulations, are driving forces for a natural formaldehyde-free formulation.

At present the wood industry almost exclusively use inexpensive, petroleum-based reactive resins or thermosets based on the reaction of formaldehyde with urea, melamine or phenols. Strict environmental restrictions lead to an increased demand to replace "substances of very high concern" such as formaldehyde and isocyanates. In particular, formaldehyde is subject to strict emission restrictions in wood products since it has been classified as "carcinogenic for humans".

The use of waste from the wood industry, which is today primarily used for thermal purposes, to promote the long-term development of a sustainable economy is also of increasing interest. The use of such renewable raw materials for the production of technical products can make a significant contribution to reduce greenhouse gas, carbon dioxide, environmentally compatible waste and recycling management, increasing resource efficiency, improving and securing employment in the rural economy and forestry as well as in the pulp producing industry through the recovery of valuable ingredients from native plants.

Tannins are such kind of biomass waste, are manufactured at low cost and are available as spray-dried and unrefined (i.e., carbohydrate-containing) powders.

Tannin-based adhesives have been used since the 1970s for industrial wood-based materials and are suitable for load-bearing exterior applications. These tannin adhesives can be used not only for wood-based panels, but also for high-quality wood-based composites such as cross-laminated timber. However, emissions of volatile organic compounds (VOC) affect these adhesives because formaldehyde is used as a hardener with tannins. Accordingly, alternative crosslinkers such as furfural, glyoxal, hexamine and various aldehydes used in tannin-based adhesive formulations have been described (Garcia, D.; Lacoste, C.; Glasser, W.; Pizzi, T.; Laborie, M.-P. (2014): *Polyphenolic resins prepared with maritime pine bark tannin and bulky-aldehydes*, Ind. Crops and Products 2014, 62, 84-93; Böhm, R.; Hauptmann, M.; Pizzi, A.; Friedrich, C.; Laborie; M.-P. (2016): *Chemical, kinetic and mechanical characterization of Tannin-based adhesives with different crosslinking systems*, Int. J. Adhes. Adhes. 68, 1-8; Hemmila, V.; Adamopoulos, S.; Karlssonb, O.; Kumar, A. (2017): RSC Adv., 7, 38604-38630). All industrial technologies realized today are based on paraformaldehyde or hexamethylene tetramine (hexamine) (Pichelin, F.; Nakatani, M.; Pizzi, A.; Wieland, S.; Despres, A.; Rigolet, S. *Structural beams from thick wood panels bonded industrially with formaldehyde free tannin adhesives*. For. Prod. J. 2006, 56, 31-36; Kamoun, C.; Pizzi, A. *Mechanism of hexamine as a non-aldehyde polycondensation hardener, Part 1: Hexamine decomposition and reactive intermediates*. Holzforsch. Holzverwert. 2000, 52, 16-19). Mechanism of hexamine as a non-aldehyde polycondensation hardener, Part 1: Hexamine decomposition and reactive intermediates, Holzforsch. Holzverwert. 2000, 52, 1619; Kamoun, C.; Pizzi, A. Mechanism of hexamine as a non-aldehyde polycondensation hardener, Part 2: Recomposition of intermediate reactive compound. Holzforsch. Holzverwert. 2000a, 52, 66-67; 9. Kamoun, C.; Pizzi, A.; Zanetti, M. *Upgrading of MUF resins by buffering additives—Part 1: Hexamine sulphate effect and its limits*. J. Appl. Polym. Sci. 2003, 90, 203-214).

Polyurethanes are materials with low VOC that increasingly attracted the wood adhesives industry in the more recent past. Polyurethane (often abbreviated PUR and PU) is a commonly encountered polymer composed of organic units joined by carbamate (urethane) links (also called urethane bonds). Polyurethane is produced from a wide range of starting materials (monomers) and is therefore a class of polymers, rather than a distinct compound. This chemical variety allows for polyurethanes with very different physical properties, leading to an equally wide range of different applications. Since polyurethanes contain two types of monomers, which polymerize one after the other, they are classed as alternating copolymers.

Synthetic polymeric 4,4'-diphenyl methane diisocyanate (pMDI) based polyurethane adhesives avoid the problems associated with formaldahyde, but the cost and toxicity of isocyanates are disadvantageous.

Non-isocyanate synthetic routes to polyurethane adhesives are currently attracting research interest as they have the potential to produce polyurethanes from "green" chemicals. Most notably, tannins and their derivatives are considered together with innovative synthetic pathways devoid of formaldehyde or isocyanate. Among the different pathways for non-isocyanate polyurethane (NIPU) synthesis, condensing tannin carbonate (methyl carbonate grafted tannin) with di or poly-amino compounds is the most promising route, and tannin technology is more attractive when compared to other bio-source materials (Pizzi, A. *Tannin-based polyurethane adhesives* 1979, 3, 1889-1891; Thebault, M., et al. *Polyurethanes from hydrolysable tannins obtained without using isocyanates*. Industrial Crops and Products, 2014, vol. 59, p. 329-336).

NIPU adhesives prepared by trans-esterification of tannins with dimethyl carbonate followed by polycondensation with hexamethylenediamine (HMDA) have been described in the literature.

Thebault, M., et al. (*Polyurethanes from hydrolysable tannins obtained without using isocyanates*, Industrial Crops and Products, 2014, vol. 59, p. 329-336) describes products obtained by first reacting chestnut tannins with dimethyl carbonate in water at 40° C., followed by subsequent reaction with hexamethylene diamine (5 g HMDA to 3.88 g of reaction mixture, reaction at room temperature and subsequent drying at 103° C. overnight). Thebault, M. et al. (*Isocyanate free condensed tannin-based polyurethanes*. Eur. Polym. J. 2015, 67, 513-526), discloses isocyanate free condensed tannin polyurethanes by first reacting tannin with dimethyl carbonate and subsequent addition of hexamethylenediamide. Dimethyl carbonate is used as a reactant and a solvent. 21 g of dimethyl carbonate were added to ten grams of tannin extract and stirred at room temperature for two hours. Thereafter, 7 g of HMDA were added. The reaction mixture was kept for 24 h at room temperature or at a temperature of 103° C. Thebault, M.; Pizzi, A.; Santiago-Medina, F. J.; Al-Marzouki, F. M.; Abdalla, S. (2017): Isocyanate-Free Polyurethanes by Coreaction of Condensed Tannins with Aminated Tannins, J. Renew. Mater, Vol. 5, No. 1) describe the reaction of an aminated tannin—obtained by reaction of tannins with ammonia hydroxide water solution—with carboxymethylated (condensed) tannins obtained by reacting tannins with dimethyl carbonate. Condensed tannins from Maritime Pine, Mimosa, and Radiata Pine barks, and Quebracho wood have been used.

However, there is still an ongoing need for non-isocyanate polyurethanes (NIPU) suitable as wood adhesives.

DESCRIPTION OF THE INVENTION

Accordingly, it was an object of the present invention to provide non-isocyanate polyurethanes with improved properties for this purpose.

This object has been achieved with the process in accordance with the independent claims. Preferred embodiments of the present invention are set forth in the dependent claims and the detailed description hereinafter.

As disclosed herein, in a first aspect the present invention relates to a process for the manufacture of a non-isocyanate polyurethane (NIPU) composition by transesterification of a condensed tannin with a carbonate or carbonate precursor followed by the reaction with a hardener selected from diamines, triamines, polyamines or mixtures thereof, particularly diamines, comprising the following steps:

a) reacting the condensed tannin with a dialkyl carbonate at a temperature in the range of from 10 to 50° C., preferably 20 to 40° C., preferably for 1 to 12 h, in a solvent selected from water, a C1 to C6 alkanol, dialkyl carbonates or a combination thereof in the presence of a catalyst selected from the group of Lewis bases, b) removing the solvent and drying the reaction product, preferably at a temperature in the range of from 30 to 60° C. for preferably about 24 to 72 h, c) mixing the reaction product obtained in step b) with a hardener selected from the group consisting of diamines, triamines, polyamines or mixtures thereof, preferably in an amount of less than 50 parts, more preferably in an amount of 20 to 40 parts, by weight of diamine, triamine or polyamine per 100 parts of reaction product of step b) in an aqueous system at a temperature in the range from 35 to 70° C., d) adjusting the pH of the system to at least pH 10, e) increasing the temperature to 80 to 110° C. and keeping the alkaline reaction medium at this temperature for at least 30 to 90 min, and f) cooling the viscous resin obtained in step e).

In embodiments, the adjusting of the pH occurs after increasing the temperature resulting from step c) to 80 to 110° C. or before increasing the temperature.

In embodiments, the drying step in step b) can occur by vacuum drying.

Preferably, the present invention relates to a process for the manufacture of a non-isocyanate polyurethane (NIPU) composition by transesterification of a condensed tannin with a carbonate or carbonate precursor followed by the reaction with a hardener selected from diamines, triamines, polyamines or mixtures thereof, comprising the following steps:

a) reacting the condensed tannin with a dialkyl carbonate at a temperature in the range of from 20 to 40° C. for 1 to 12 h in a solvent selected from water, a C1 to C6 alkanol or a combination thereof in the presence of a catalyst selected from the group of Lewis bases, b) removing the solvent and drying the reaction product at a temperature in the range of from 30 to 60° C. for 24 to 72 h, c) mixing the reaction product obtained in step b) with a hardener selected from the group consisting of diamines, triamines, polyamines or mixtures thereof in an amount of 20 to 40 parts by weight of diamine, triamine or polyamine per 100 parts of reaction product of step b) in an aqueous system at a temperature in the range from 35 to 70° C., d) adjusting the pH of the system to at least pH 10, e) thereafter increasing the temperature to 80 to 110° C. and keeping the alkaline reaction medium at this temperature for 30 to 90 min, and f) cooling the viscous resin obtained in step e).

Tannins are extracted from agroforestry biomaterials, such as wood, bark, leaves, and fruits, by water extraction. Tannins can be categorized as hydrolysable tannin or condensed polyflavonoid tannin.

Hydrolysable tannin comprises different types of unit structures, including gallic, digallic, and ellagic acids.

Condensed tannins which are used in the process of the present invention consist of flavonoid oligomers of various degrees of polymerization. These units are associated with their precursors, such as flavanes-3-ol and flavanes-3,4-diol, among other flavonoids. Each flavonoid contains two types of phenolic nuclei, which are usually denoted as A and B-ring.

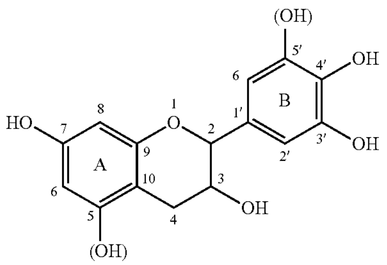

The A-ring includes resorcinol and phloroglucinol, whereas the B-ring includes pyrogallol and catechol, among other rare phenols. The A-rings of different tannins possess different chemical structures. The A-rings of tannins extracted from mimosa/wattle, quebracho, Douglas fir, and spruce include resorcinol as main group, whereas those of pine include phloroglucinol as main group.

The main polyphenolic pattern is represented using flavonoid analogs that are based on the resorcinol A-ring and pyrogallol B-ring (structure I). This unit structure accounts for 70% of tannin. Unit structure II constitutes 25% of tannin and comprises a resorcinol A-ring and catechol B-ring. The remaining 5% is a mixture of phloroglucinol-pyrogallol (structure III) and phloroglucinol-catechol (structure IV) flavonoids. The remaining components are non-tannins, which are simple carbohydrates, hydrocolloid gums, and nitrogen compounds, i.e., amino and imino acids.

(I)

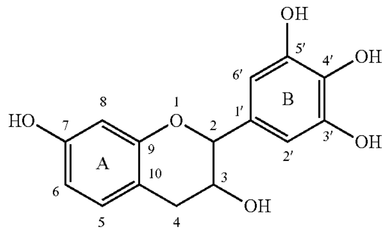

(II)

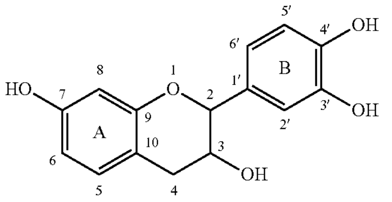

(III)

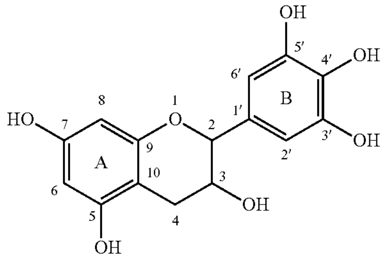

(IV)

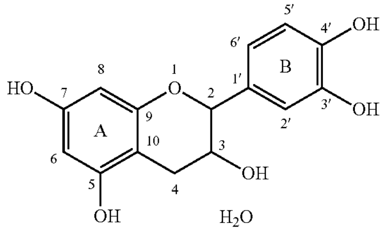

$H_2O$

Pine tannin mainly presents two patterns: one is represented by phloroglucinol A-ring and catechol B-ring structures (structure IV having one additional hydroxy group at ring atom 4) and the other is represented by phloroglucinol A-ring and phenol B-ring structures (structure IV with no hydroxyl group in position 4' but a hydroxyl group in position 4).

The flavonoid units are generally linked C-4 to C-6, or C-4 to C-8 to form a variety of short chains. Products obtained by C-4-C-6 bonding of units of structure I above are called prorobinetinidin, those obtained by bonding of units of structure II through C-atoms 4 and 6 are called profisetinidin, those obtained by C-4-C-8 bonding of units of structure III are called prodelphinidin and those obtained by linking groups of structure IV through C-atoms 4 and 8 are called procyanidine.

The average number of units varies from monomers to octamers with an average degree of polymerization (DP) between 4 and 5.

Wattle-extracted tannin comprises on average 4-5 flavonoid units joined together through 4,6-linkages. Pine tannin is phloroglucinolic in nature and its flavonoid units are joined together through C-4-C-8-interflavonoid linkages. Linear polymeric tannins have only C-4-C-6- or C-4-C-8-linkages. However, 4,6—and 4,8-linkages may simultaneously exist in the presence of resorcinolic and phloroglucinolic A-rings.

The majority of the flavonoid part of mimosa tannin extract is composed of robinetinidin and fisetinidin but also includes 10-15% of catechin and delphinidin, each of these monomers forming the repeating units of the tannin, the units being respectively linked by C-4-C-6 or C-4-C-8.

Maritime and Radiata Pines tannins both present a majority of procyanidin and prodelphinidin flavonoid structures; whereas Quebracho tannin's major components are profisetinidin, and Mimosa tannin's prorobinetinidin.

Principally any condensed tannin is suitable for use in the present invention and the skilled person will select the type of tannin based on his professional experience and taking into account the requirements of the specific application case. There is thus no need for further detailed explanations. Condensed tannin extracts, which are the preferred type of tannins, are also available from different commercial suppliers.

In certain application cases condensed tannin obtained from Quebracho wood has shown certain advantages. Quebracho trees are a variety of hard woods primarily grown in the Gran Chaco region of South America. They belong to the species *Shinopsii* or *Aspidosperma.*

In the process in accordance with the present invention a condensed tannin is subjected to transesterification with a dialkyl carbonate or a precursor thereof. Transesterification is the process of exchanging the organic group of an ester (in the process of the invention the carbonate or its precursor) with the organic group of an alcohol (in the process of the invention the condensed tannin):

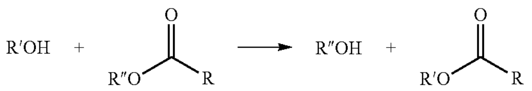

This leads to a partial conversion of the phenolic hydroxyl groups in the condensed tannin to carboxyalkylated groups.

Preferred dialkyl carbonates are those having 1 to 4 carbon atoms in the alkyl groups. A particularly preferred dialkylcarbonate is dimethyl carbonate.

The term precursor, when used herein, denotes any compound which under the reaction conditions is converted into a dialkyl carbonate which dialkyl carbonate then is the active species in the transesterification reaction.

The condensed tannin is reacted in step (a) of the process in accordance with the invention with the dialkyl carbonate or its precursor at a temperature in the range of from 20 to 40° C., preferably at ambient temperature (room temperature) for a period of from 1 to 12 hours, preferably of from 2 to 10 hours and even more preferably of from 3 to 8 hours.

The reaction is carried out in a solvent selected from water, $C_1$-$C_6$ alkanols, dialkyl carbonates or a combination thereof. The dialkyl carbonate used as reactant may also serve the purpose of a solvent, depending on the solubility of the condensed tannins in said dialkyl carbonate. Dimethyl carbonate is a good solvent for most condensed tannins.

Preferred solvents are alkanols, particularly $C_1$-$C_6$-alkanols, more preferably alkanols having 1 to 4 carbon atoms with ethanol being the most preferred alkanol.

The weight ratio of water to alkanol if such mixture is used is not subject to limitations and will be chosen by the skilled person in accordance with his/her professional knowledge and experience.

The reaction is carried out in the presence of a Lewis base as catalyst. Preferred Lewis bases are nitrogen containing compounds such as 1,8-Diazabicyclo[5.4.0]undec-7-ene (DBU), 1,5,7-Triazabicyclo[4.4.0]dec-5-ene (TDB) and 1,5-Diazabicyclo[4.3.0]non-5-ene (DBN). The skilled person will select the appropriate catalyst based on his/her professional expertise taking into account the specific conditions.

Amidines with the functional group $R^1C(=NR)N(R^2)_2$, where R, $R^1$ and $R^2$ can be the same or different, may be mentioned as a preferred group of catalysts. They are the imine derivatives of amides ($R^1C(O)N(R^2)_2$). The simplest amidine is formamidine, HC $(=NH)NH_2$. $R^1$ respectively $R^2$ can be preferably selected from the group consisting of hydrogen atoms or alkyl groups with preferably 1 to 6 carbon atoms. $R^1$ and $R^2$ together can also form a $C_1$ to $C_5$-alkylene group which, together to the atoms to which they are bonded, then can form a ring system. If both $R^1$ and $R^2$ constitute such an alkylene group, annealed rings are formed.

In the process of the present invention, annealed amidine bases (i.e. amiodines containing condensed rings as described above) constitute a preferred group of catalysts. DBU (1,8-diazabicyclo[5.4.0]undec-7-ene) or 1,5-Diazabicyclo(4.3.0) non-5-en (DBN) have been shown to be advantageous as catalysts in certain applications. Triazabicyclo [4.4.0]dec-5-ene (TDB) is a further example of a preferred catalyst. DBU which may be mentioned as particularly preferred annealed amidine base is a colourless liquid which is easily miscible with water.

The amount of catalyst used is preferably in the range of from 0.001 to 1 mol %, particularly preferred in the range of from 0.02 to 0.5 mol % and even more preferably in the range of from 0.05 to 0.25 mol %, based on total moles of hydroxyl groups present in the condensed tannine used as reactant.

In step (b) of the process of the invention the solvent is removed and the reaction product is dried at a temperature in the range from 30 to 60° C., preferably form 40 to 50° C. for 24 to 72 hours, preferably 36 to 60 hours.

Thereafter, in step (c) of the process of the invention, the reaction product obtained in step (b) or an aqueous solution thereof with a solid content preferably in the range from 30 to 60 wt % is mixed with a hardener selected from the group consisting of diamines, triamines, polyamines or mixtures thereof. The amount of diamine, triamine or polyamine, is in the range of 20 to 40, preferably from 25 to 35 parts by weight of diamine, triamine or polyamine per 100 parts by weight of the reaction product obtained in step (b).

In preferred embodiments, the reaction product obtained in step (b) is dissolved in water, preferably at a temperature of about 35 to 75° C., more preferably at about 50-60° C., and the hardener is then added to the solution containing the dissolved reaction product of step (b).

Preferred diamines useful as hardeners are aliphatic diamines, such as preferably $C_2$-$C_8$ alkylene diamines with hexamethylene diamine being particularly preferred. However, any diamine, triamine, polyamine or mixture thereof which reacts with the carbonated phenolic hydroxyl groups in the reaction product of step a) under formation of a urethane bond is principally suitable.

The hardener is added at a temperature in the range from 35 to 75° C., preferably in the range of from 40 to 65° C.

Thereafter, in step (d) of the process of the invention, a base is added to adjust the pH to a pH of at least 10, preferably to a pH in the range of from 10 to 12.

Preferred bases for this purpose are aqueous solutions of alkali or alkaline earth metal hydroxides, with aqueous sodium hydroxide being particularly preferred due to its ready availability and low cost.

A cyclic alkylene carbonate, preferably a $C_1$ to $C_4$ alkylene carbonate such as e.g. propylene carbonate can be used as curing accelerator. If used, the amount of cyclic alkylene carbonate is preferably in the range of from 2 to 8, more preferably 3 to 5 parts by weight per 100 parts by weight of the product obtained in step (b).

In accordance with an embodiment of the present invention, it is also possible to add up to 5, preferably 1 to 3 parts by weight per 100 parts by weight of the reaction product obtained in step (b), of hexamethylentetramine (also called hexamine) as an additional hardener besides the diamine, triamine, polyamine or mixtures thereof.

After adjusting the pH in step (d), in step (e) of the process of the invention, the temperature is increased to a temperature in the range from 80 to 110, preferably from 85 to 100° C. and kept at this temperature for 15 to 90 minutes or longer, preferably for 20 to 50 minutes.

In embodiments of the process, the adjusting of the pH may occur after the temperature of the mixture of step (c) has been increased to 80 to 110° C. Furthermore, the optional curing accelerator or additional hardener may be added before or after increasing the temperature of the mixture, and before or after adjusting the pH.

In the final step, the reaction product obtained in step (e) is cooled. It can be stored in a refrigerator.

The reaction of the product obtained in step (b) with the hardener selected from diamines, triamines, polyamines or mixtures thereof can be carried out in the presence of a catalyst. If present, the catalyst is generally used in an amount from 0.001 to 0.1 mol %, preferably from 0.01 to 0.05 mol %, based on the total moles of carboxyalkylated groups present in the reaction product of step (a). The skilled person is aware of suitable catalysts for this type of reaction and will select a suitable compound based on his/her professional experience and taking into account the specific reactants used. Accordingly, no detailed information about suitable catalysts needs to be given here. Just by way of example, 1,5,7-Triazabicyclo(4.4.0)dec-5-en (TBD) may be mentioned as suitable catalyst here. Further suitable catalysts may include 1,8-Diazabicyclo[5.4.0]undec-7-ene (DBU) or 1,5-Diazabicyclo[4.3.0]non-5-ene (DBN).

In the reaction products obtained in step (a) a part of the phenolic hydroxyl groups are replaced by alkoxycarboxyl groups. In general, 30 to 60%, preferably 35 to 55% of the phenolic hydroxyl groups are modified in this way. The amount of grafting of the carbonate groups in this manner can be determined by $^{31}P$-NMR and thereby the degree of substitution, expressed as the percentage of phenolic hydroxyl groups present after the reaction to the total number of hydroxyl groups before the reaction, can be calculated.

The grafting of the carbonate groups on the phenolic hydroxyl groups of the condensed tannins is more efficient than has been reported in the prior art, which is an important advantage of the present invention as the efficiency of urethane bond formation when reacting the reaction product of step (a) depends on the amount of grafting of the carbonate groups.

The present invention in a further embodiment provides compositions based on condensed tannins wherein 30 to 60% of the phenolic hydroxyl groups have been replaced by carbonate groups, i.e, which have a degree of substitution (DS) of the phenolic hydroxyl groups in the condensed tannin used as a starting material, in the range from 0.3 to 0.6, preferably in the range from 0.35 to 0.55.

Such products have not been described before.

Still another embodiment of the present invention relates to a composition comprising a carbonated condensed tannin, in which 30 to 60%, preferably 35 to 55% of the phenolic hydroxyl groups have been replaced by carbonated groups, and a diamine, triamine or polyamine. Such a composition can be easily converted to a non-isocyanate polyurethane (NIPU) by heating to a temperature above 35° C. as e.g. in accordance with the process of the present invention.

Another embodiment of the present invention relates to a non-isocyanate polyurethane (NIPU) composition obtainable by reaction of a carbonated derivative of tannin, preferably a condensed tannin, comprising 30 to 60%, preferably 35 to 55%, based on the total number of phenolic hydroxyl groups present in the tannin before carbonation, of carbonated phenolic hydroxyl groups, with a diamine, triamine, polyamine or mixture thereof, preferably an aliphatic diamine, triamine or polyamine, especially preferably an aliphatic diamine having 2 to 8 carbon atoms in an amount of less than 50 parts by weight of diamine, triamine, polyamine or mixture thereof per 100 parts of carbonated derivative of tannin.

The tannin-based non-isocyanate polyurethane compositions of the present invention, such as a non-isocyanate polyurethane (NIPU) composition generated or obtainable by the process of the invention and the composition comprising a carbonated condensed tannin, in which 30 to 60%, preferably 35 to 55% of the phenolic hydroxyl groups have been replaced by carbonated groups, and a diamine, triamine or polyamine, perform very well as adhesives for wood bonding, achieving up to 10 $N/mm^2$ dry bond strength (according to the DIN EN302-1, 2013 standard), that is well above any other reported adhesives from renewable resources. Furthermore, the tannin-based non-isocyanate polyurethane compositions of the invention perform well in wet environments, passing the test A1 and A3 according to the DIN EN302-1, 2013 standard.

Since the tannin-based non-isocyanate polyurethane compositions of the present invention are devoid of formaldehyde and of isocyanate, the compositions represent practically VOC-free adhesives, meaning that there are no relevant amounts of VOC present during manufacture and application/service of the adhesives/compositions.

An important advantage of the present invention is that the compositions described herein are fire resistant (or fire retardant, meaning that the compositions are resistant to and withstand high temperatures and are not easily inflammable) due to the known fire-resistance of tannin, which is the main component of the inventive compositions.

Features that are disclosed in the context of the process of the invention also read on the NIPU composition of the invention obtainable by reaction of a carbonated derivative of tannin, preferably of a condensed tannin, comprising 30 to 60%, preferably 35 to 55%, of carbonated phenolic hydroxyl groups, with a diamine, triamine, polyamine, as well as on the different compositions of the invention, and the other way around.

The process of the present invention provides an efficient method for the formation of non-isocyanate polyurethanes (NIPU) adhesives from bio-based resources. In the manufacture of wood composites of any type adhesives play an essential role. NIPUs are receiving increasing attraction in this regard for achieving the goal of reducing the environmental hazards caused by wood adhesives which until today are mostly based on isocyanate containing products.

Furthermore, the compositions in accordance with the present invention also do not have the issue of volatile organic compounds which arise if e.g. formaldehyde is used in the manufacture of wood adhesives.

The compositions obtained in accordance with the present invention can be used as adhesive in basically any type of wood composite.

Wood composites are a growing field of products that are increasingly present for a variety of applications. In general, two main and distinct groups of wood composites exist, namely, strictly speaking, just wood panel composites and the rest, this latter being glulam, fingerjoints, etc., with parallam and scrimber really belonging in the margin of both classes. In general, also, a wood composite is a composite in which the wood is in a markedly dominant proportion.

The history of wood composites themselves is inextricably intertwined with the history and the development of the polymer binders that hold them together and their manufacture.

Wood is a natural composite made of approximately 60-65% carbohydrate fibers (approx. two-thirds cellulose and one-third hemicelluloses), 25-30% of a random polyphenolic branched polymer, lignin, functioning as a fiber binder, and 10% of residues, extractives, or cellular waste, infiltrates (oleoresins, tannins, starches, some inorganic salts, etc.) coating its porous cellular surfaces.

Wood panel manufacturing is based on the densification of a particle mat and its consolidation in a hot press. At a molecular level, wood cells are deformed above their elastic domain and plastic deformation, or damage occurs. Both mechanisms result in an irreversible deformation. As wood viscoelastic properties depend on internal mat conditions, when the environment is such that the viscous component becomes very important, flow takes place, and this leads to a true plastic deformation. If conditions do not allow or inhibit molecular movement, damage will appear. Thus, mechanisms that occur in wood densification and are regarded as a manifestation of plasticity would, under different circumstances, be considered as damage. Referring to wood composites, most of the final board properties depend on how wood cells buckle.

Many types of wood panels, for a variety of applications, are manufactured today. Their definitions, in brief, are as follows:

Particleboard: A flat hot-pressed wood composite panel composed of randomly oriented wood chips bonded by hot-pressing by using thermosetting adhesive resins, mainly urea-formaldehyde (UF), melamine-urea-formaldehyde (MUF), phenolic resins (PF and TF), and isocyanates (pMDI). The board is generally composed of three distinct layers, the surface layers being composed of finer wood chips than the coarser core layers. Some processes yield a continuously chip-size-graded board along the surface/core/surface thickness. The panel usually has a density of 650-700 kg/m3 and the average amount of resin solids in the board core section is of between 6% and 12% on dry wood (although lower and much higher percentages are also sometimes used). Panels of the same type but composed of wood chips of greater length and greater width but similar thickness are called also flakeboard and waferboard.

Oriented Strand Board (OSB): A flat hot-pressed three-layers wood composite panel composed of oriented wood wafers bonded by hot-pressing by using thermosetting adhesive resins. The very thin wafers (length and width are very much bigger than in particleboard and of the order of 100 mm×20 mm, respectively) are oriented in the same direction within the same layer and at 90° of each other in adjacent layers yielding a particularly strong panel very suitable for structural applications. It is the modern competitor of plywood but at a much lower price. The lower surface area of the wafers, in relation to other types of panels, yields panels that need to be bonded with only 4-5% adhesive solids on dry wood. OSB is, today, the main substitute panel for the rather more expensive plywood but presenting the same advantages. It is a panel for structural use.

Medium Density Fiberboard (MDF): a flat hot-pressed composite panel composed of wood fibers obtained by thermomechanical wood pulping and traditionally bonded with an adhesive to a density of around 750-800 kg/$m^3$. MDFs of much lower densities are also known. It is a panel mainly bonded with urea-formaldehyde resins and used for furniture and interior use. Its production has experienced a considerable growth.

Hardboard (high density fiberboard): A flat-pressed wood composite panel composed of randomly oriented wood fibers obtained by thermomechanical wood pulping and traditionally bonded without any adhesive by hot-pressing simply by the very high density (900-1100 kg/m3) and the high-temperature-induced flow of the lignin component of the fibers. Panels containing a small amount of adhesives (2-3% adhesive solids on dry fiber), generally PF resins, are often produced today to upgrade the properties of the panel.

Plywood: A flat hot-pressed multilayer wood panel composed of oriented wood veneers bonded by hot-pressing by using thermosetting adhesive resins. The veneer wood grains are oriented at 90° of each other in adjacent layers, yielding a particularly strong panel. As a consequence, this is the panel with the best strength/weight ratio but is rather expensive in relation to the equally strong OSB.

Laminated Veneer Lumber (LVL): A flat-pressed multilayer wood panel similar to plywood composed of oriented wood veneers but differently from plywood oriented all in the same direction in all the layers and bonded by hot-pressing by using thermosetting adhesive resins.

Laminated beams (glulam), parallam, scrimber, and fingerjoints: A flat-pressed multilayer wood beam with thick wood planks constituting the layers, used for structural exterior applications and bonded today with PRF (phenol-resorcinol-formaldehyde) cold-setting resins, or MUF cold-setting resins, or even with certain types of polyurethanes (PURs), especially single-component PURs. The individual wood planks are bonded to the necessary length to compose the beam by fingerjoints bonded with adhesives. Parallam and scrimber are similar products. Parallam is a beam made by a continuous manufacturing process composed of bigger size wood needles (very elongated wood particles) reassembled with a structural exterior grade adhesive, the favorite adhesive when heat curing being isocyanates (pMDI) and PRFs when cold-curing. Scrimber was instead conceived by the CSIRO in Australia with the idea of "scrimming", thus breaking down the structure of the wood by crushing it only as far as necessary and producing bundles of interconnected but still aligned strands to allow it to be formed by coating them with an adhesive into a desired end-product, rather than destroying the natural alignment of wood fibers and realigning them as more conventional processes do.

As mentioned above, the NIPU compositions in accordance with the present invention or as obtained by the process of the present invention are principally suitable as adhesives for any type of wood composites. The skilled person will take into account the specific wood composite needs and will select a suitable NIPU composition in accordance with the present invention.

Shear strength values achieving or even exceeding the values required by EN 302-1 (2013) under certain of the standard climate conditions (load classes) described therein have been achieved with the NIPU compositions in accordance with the present invention.

The present invention enables the use of an industrially suitable solvent (such as ethanol) for carbonation of the tannin which was possible at room temperature. Furthermore, only a minimum amount of dialkyl carbonate compared to the prior art is needed to achieve a high degree of substitution.

In the process of the use of highly toxic compounds, such as phosgene and phosgene derivatives, aliphatic and aromatic diisocyanates, and highly toxic solvents, such as DMF, are avoided and not used. Instead, water-based solvents, and dimethyl carbonate (DMC), which is synthesized from $CO_2$, can be used.

The NIPU-compositions in accordance with the present invention can be obtained with a lower amount of hardener compared to the prior art and the bond strength exceeds the values reported for VOC-free tannins described in the prior art.

Thus, the present invention provides compositions suitable as wood adhesives with superior properties compared to the prior art and which can be obtained by a process minimizing resource consumption.

FIGURES

FIG. 1: Reaction scheme of stage A—NIPO precursor from tannin.

Figure 2:
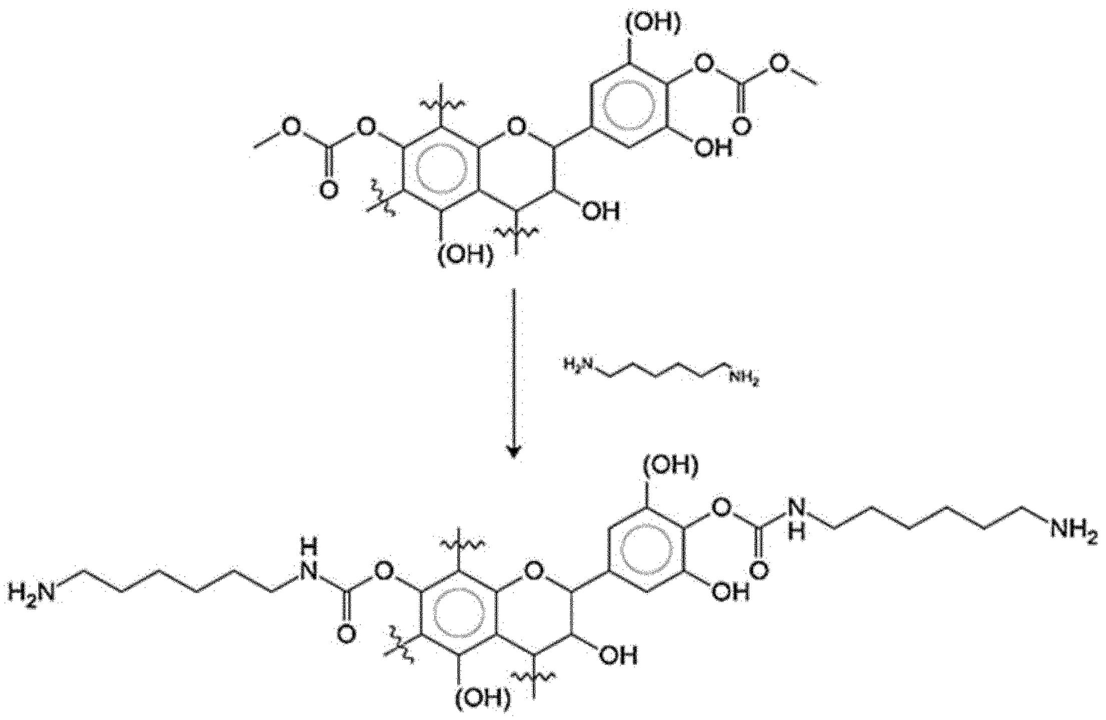

FIG. 2: Reaction scheme of stage B—preparation of tannin based NIPU resins.

EXAMPLES

The invention is further described by the following examples. These are not intended to limit the scope of the invention but represent preferred embodiments of aspects of the invention provided for greater illustration of the invention described herein.

Methods of the Examples

Condensed tannins used were supplied by Silva Chimica (St. Michele Mondovi, Italy). hexamethylenediamine (HMDA), "DBU" (1,8-diazabicyclo[5.4.0]undec-7-ene), Hexamine (reagent, 100-97-0), propylene carbonate, dimethyl carbonate and sodium hydroxide were purchased from Sigma-Aldrich. Tris(2-aminoethyl)amine (TAEA, an aliphatic triamine), 1,4-Bis(aminomethyl)-benzene (BAMB, an aliphatic diamine with a benzene ring) and Poly(ethyleneimine (PEI, a polyamine) were supplied from Sigma-Aldrich under the Merck reference numbers 4097-89-6, 539-48-0 and 9002-98-6 respectively. The Poly(ethyleneimine (PEI) was provided as a 50% aqueous solution with an average m.w. 1300 D.

For $^{31}$PNMR analysis, deuterated chloroform (CDCI3), pyridine-dry, 2-chloro-4,4,5,5-tetramethyl-1,3,2-dioxaphospholane (TMDP), cholesterol and Chromium (III) acetylacetonate were also obtained from Sigma-Aldrich.

Characterization Techniques

FTIR Spectroscopy: The Spectra of all the samples were recorded by means of FTIR in the attenuated total reflection mode (4000 to 650 $cm^{-1}$, 32 scans, 4 $cm^{-1}$ resolution) with Spectrum 65 (PerkinElmer, US). The spectrograms were analyzed with the software (PerkinElmer, US) using ATR correction and normalization at 1510-1515 $cm^{-1}$(aromatic ring vibrations). $^{31}$P NMR: $^{31}$P NMR analyses were performed after phosphitylation of the samples, according to standard protocols (Granata, A.; Argyropoulos, D. S. 2-Chloro-4,4,5,5-tetramethyl-1,3,2-dioxaphospholane, a Reagent for the Accurate Determination of the Uncondensed and Condensed Phenolic Moieties in Lignins. J. Agric. Food Chem. 1995, 43 (6), 1538-1544). The spectra were measured on a Bruker 300 MHz spectrophotometer, with 128 scans and a 15 s relaxation delay. Peaks assignations were performed based on previous studies on tannin model compounds (Melone, F.; Saladino, R.; Lange, H.; Crestini, C. Tannin Structural Elucidation and Quantitative 31 P NMR Analysis. 2. Hydrolyzable Tannins and Proanthocyanidins. J. Agric. Food Chem. 2013, 61 (39), 9316-9324).

Thermogravimetric analysis (TGA): about 5 mg of samples were placed in thermogravimetric analyzer, Pyris 1(Perkin Elmer, USA) and heated to 900° C. at 10° C./min under nitrogen stream. The TGA was used to evaluate the water content and the thermal stability of the TANIPU adhesives.

Differential scanning calorimetry; The glass transition temperature ($T_g$) was determined by differential scanning calorimetry (DSC 8500, PerkinElmer, USA), under nitrogen flow. The samples (8-10 mg) were heated to 30-250° C. with a heating rate of 10° C. $min^{-1}$. The $T_g$ was determined as the midpoint of the change in slope of the baseline from the first heating scan.

Viscosity of the adhesives were measured with vibro viscometer SV-10 A series by Tuning fork vibro method (natural frequency at 30 Hz) at 22-23° C.

Size exclusion chromatography (SEC): The number-average molar mass (Mn) and the mass-average molar mass (Mw) of acetylated stage B sample (NIPU-1) and QSF acelytated were determined by size exclusion chromatography (SEC) using GPC SECurity 1200 system (PSS—Polymer Standards Service, U.S.A.). Dimethyl acetamide (DMAc+0.5 LiBr) was used as the eluent at a flow rate of 1 mL $min^{-1}$ with refractive index (RI) detector. The apparatus was calibrated with PMMA standards.

Rheological experiment; The measurements were done on Anton Paar Rheometers model MCR 301 (Austria), A parallel plate with the dimension of 25 mm geometry and 0.5 mm gap between the plates was used for the measurement. The curing behavior of adhesives were examined by heating to 240° C. while maintaining constant 1 Hz frequency in $N_2$ atmosphere.

Shear strength test: Shear strength of the adhesive bonds was tested according to DIN EN302-1 (2013). Two 5 mm thick beech wood panels conditioned 20° C./65 relative humidity (RH) for 7 days, were bonded by pressing at 200° C./1 MPa/10 min. Approximately 150 g·$m^{-2}$ (based on solid content) of stage-B adhesives were applied onto the each side of the two wood panels. The bonded assemblies were cut into test specimens according to the standard procedure. After conditioned at 20° C./65 RH for 7 days, the bonding strength of the adhesives were tested on a Zwick/RoellZ100 universal testing machine (Macrosense, Zwick/Roell, Ulm, Germany) using a crosshead speed of 1.0 mm/min until failure.

Stage A: NIPU Precursor from Tannin

Carbonated derivatives of tannin were prepared by transesterification reaction between quebracho tannin (QSF) and dimethyl carbonate (DMC) in 1:1 eq. amount, in water as well as in ethanol (4 eq. amount) medium for 6 h at room temperature. The catalyst with the short name "DBU" (1,8-diazabicyclo[5.4.0]undec-7-ene) (0.1 mol % eq. to total OH molar functionality in QSF) from the group of nucleophilic amines, was mixed with water at beginning of the reaction. Afterwards, the solvents were removed and the reaction products were dried at 40° C./48 h. Vacuum drying at 40° C. achieved similar results. The excess ethanol/DMC can be recycled and reused.

The obtained sample was analyzed with $^{31}$P-NMR spectroscopy, after derivatization with TMDP and analytically characterized by FTIR spectroscopy. The analytical results proved that the successful course of the transesterification of tannin with dimethyl carbonate and illustrates high degree of carbonate substitution could be achieved (Table 1). Importantly, the efficient cross-linking with diamines guaranteed with this level of modification has not been achieved with known techniques.

TABLE 1

Quantitative estimation of carbonate groups grafted onto tannin units ($^{31}$PNMR data)

| Sample | Phenolic-OH | Aliphat•OH | Carbox•OH | Grafting level |
|---|---|---|---|---|
| QSF-Cb ($H_2O$) | 6.74 | 1.6 | 0.06 | 43% |
| QSF-Cb (Ethanol) | 6.62 | 0.99 | 0.063 | 44% |
| QSF-unmodifiedTannin | 11.89 | 0.54 | 0.057 | 0 |

QSF-Cb is carbonated tannin.
All values in mmol/g

Stage B: Resin Preparation

The Stage A carbonated tannin was mixed with water to get ~40% conc. and stirred at 50-60° C. until a dark brown solution was formed. The respective hardener selected from diamines, triamines, polyamines or mixtures thereof such as hexamethylene diamine (HMDA), Tris(2-aminoethyl)amine (TAEA) etc, was added into the aqueous solution at 50-60° C. in a closed system according to the recipes provided in Table 2. The hardener was added in an amount of 20-40 parts by weight of amine per 100 parts of reaction product of Stage B in an aqueous system at a temperature in the range from 35-70° C., adjusting the pH of the system to at least pH 10 with NaOH. Then temperature was increased to 90° C. and stirring was continued for another 15-20 min. Then propylene carbonate was added or, where relevant (in the case of TANIPU-3), NaOH was partly substituted by propylene carbonate (PC). The cooking was continued for 30 min at 90° C. The alkaline reaction medium was thus kept at 90° C. for 30 to 90 min. Finally, in some embodiments, hexamine (HA) was added in 1-2 pbw 5 min before stopping the stirring. The viscous resins (TANIPUs) were cooled and stored in freezer.

For the production of TANIPU-1 and TANIPU-2, the catalyst, 1,5,7-triazabicyclo[4.4.0]dec-5-ene (TBD) was mixed along with HMDA or another hardener according to the recipes as given in Table 2. For the preparation of TANIPU-3 to TANIPU-7 no catalyst was used.

TABLE 2

Formulation of TANIPU adhesives

| Resin | Tannin Stage A pbw | Hardener (pbw) | PC pbw | NaOH pbw | HA pbw | TBD mol % |
|---|---|---|---|---|---|---|
| TANIPU-1 | 100 | HMDA (28) | 0 | 14 | 0 | 0.018 |
| TANIPU-2 | 100 | HMDA (28) | 0 | 14 | 1 | 0.018 |
| TANIPU-3 | 100 | HMDA (28) | 4 | 10 | 1 | 0 |
| TANIPU-4 | 100 | HMDA (28) | 0 | 14 | 2 | 0 |
| TANIPU-5 | 100 | TAEA (24) | 0 | 14 | 2 | 0 |
| TANIPU-6 | 100 | PEI (34) | 0 | 14 | 2 | 0 |
| TANIPU-7 | 100 | BAMB (33) | 0 | 14 | 2 | 0 |

pbw represents parts by weight

Table 2.1 shows the results of the bonding strengths of the above adhesive formulations assessed according to the DIN EN302 (1-2) (2013) standard as well as their adhesive classes. The bonding strength of the formulations was assessed in dry and wet conditions according to the DIN EN302(1-2) (2013) standard, so as to classify their performance as loading class; A1 (dry adhesion) and A2 (wet adhesion). Six set of wood panels were immediately assembled and pressed in a hydraulic hot press at 200° C. and 1 MPa for 10 min. The shear strength of lap joint test specimens with thin bond line (close contact EN 302-(1-2) was determined according to EN302-(1-2). All TANIPU resins except TANIPU-1 achieved shear strength values of 10 $N/mm^2$ as required by EN302-1 for the A1 load class.

The delamination resistance of the first set of TANIPU resins was also tested according to DIN EN302-2 (Table 2.1). While TANIPU-2 maintains the best performance at ca. 3.8 $N/mm^2$ in wet adhesion, the resistance to delamination in a wet environment (4 days soaking in water) remained below the required wet strength of 6 $N/mm^2$ to qualify as A2 adhesives. To the best of the authors' knowledge, the wet strength of the TANIPU resins developed in this work ranks highest in performance among all developed renewable adhesives for wood bonding in exterior applications.

TABLE 2.1

Bonding Strengths and adhesive classes of the TANIPU adhesives

| Resin | Bonding Strength (STDEV) - $N/mm^2$ Dry (EN302-1) | Wet (EN302-2) | Adhesive Class |
|---|---|---|---|
| TANIPU-1 | 9.7 (±0.5) | 2.5 (±0.18) | — |
| TANIPU-2 | 10.12 (±0.52) | 3.8 (±0.15) | A1 |
| TANIPU-3 | 10.09 (±0.77) | 2.6 (±0.21) | A1 |
| TANIPU-4 | 12.50 (±0.35) | NT | A1 |
| TANIPU-5 | 10.37 (±1.03) | NT | A1 |
| TANIPU-6 | 11.05 (±0.75) | NT | A1 |
| TANIPU-7 | 11.22 (±1.63) | NT | A1 |

Abbreviations in the above table include the following:

HMDA—(hexamethylene diamine), an aliphatic diamine

TAEA—(Tris(2-aminoethyl)amine) (4097-89-6 Merck), an aliphatic triamine

BAMB—(1,4-Bis(aminomethyl)-benzene) (539-48-0 Merck), an aliphatic diamine with Benzene ring PEI—(Poly(ethyleneimine) (50% aqueous solution, m.w. 1300D) (9002-98-6 Merck), a polyamine HA—hexamine PC—propylene carbonate TBD—1,5,7-triazabicyclo[4.4.0]dec-5-ene NT—Not tested FTIR analysis confirmed the formation of carbonated tannin (band near 1720-1740 $cm^{-1}$) as well as the urethane bond stretching with the presence of the C═O and N–C bonds at 1722&1568 $cm^{-1}$ respectively.

TABLE 3

Reaction conditions and physical properties of products obtained

| Resin | pH | Viscosity (mpa/s) | Solid content % |
|---|---|---|---|
| TANIPU-1 | 11.38 | 995 | 46 |
| TANIPU-2 | 11.45 | 2000 | 50 |
| TANIPU-3 | 10.54 | 2500 | 49 |
| TANIPU-4 | | 2200 | 52 |
| TANIPU-5 | | 1800 | 47 |
| TANIPU-6 | | 2700 | 48 |
| TANIPU-7 | | 2100 | 50 |

Testing Adhesives and Adhesive Properties

The resins were tested with a target solids content of 40-50 wt % and a viscosity between 1000-3000 m·Pa·s. The resins were characterized by FTIR, curing behavior was examined by rheology and bonding properties at different climate conditions were measured as per the standard method EN 302-1 (2013).

The degree of substitution of the phenolic hydroxyl groups in the product obtained after step (a) was 43% for the reaction in water and 44% for the reaction carried out in ethanol and was determined by $^{31}$P-NMR. The initial number of phenolic hydroxyl groups in the starting material (Quebracho condensed tannin) was 11.89 mmol/g and was reduced to 6.74 respectively 6.62 mmol/g after reaction in water respectively ethanol. The FTIR analysis confirmed the grafting of carbonate groups in tannin structure (band near 1720-1740 $cm^{-1}$).

These analytical results proved that the successful course of the transesterification of tannin with dimethyl carbonate and illustrates that a high degree of carbonate substitution previously undisclosed could be achieved. The most important aspect is the efficient cross-linking with diamines guaranteed with this level of modification, which was not shown previously.

A part of TANIPUs 1, 2 and 3 was freeze dried and used for FTIR, DSC and TGA measurements. FTIR analysis of TANIPUs confirmed the presence of urethane structures, the urethane bond stretching with the presence of the C═O and N—C bonds at 1722 & 1568 $cm^{-1}$.

The thermo gravimetric analysis (TGA) of TANIPUs 1, 2 and 3 provided information about their degradability. The thermal stability mainly depends on the crosslinks developed especially from the urethane linkages. Information on the thermal degradation behavior of TANIPU 1 and TANIPU 2 is given in Table 4. Two-major thermal degradation processes were observed in addition to small peaks of moisture loss with 5 wt % up to around 200° C. The major weight loss of 25-30% happened in the temperature range from 200-335° C. This degradation is probably due to the higher contents of urethane bonds. This event is continued slowly and maximize at around 500° C. in both adhesives.

TABLE 4

Thermal properties and SEC data of TANIPUs 1 and 2.

| Sample | DSC-Tg, ° C. | TGA wt loss at 200° C. | TGA $1^{st}$ $T_d$ ° C. | TGA $2^{nd}$ $T_d$ ° C. | SEC (Mw/Mn) g/mol × $10^{-3}$ |
|---|---|---|---|---|---|
| TANIPU 1 | 158 | 5 | 196-337 | 424-637 | 2.12/3.84 |
| TANIPU 2 | 163 | 4.8 | 198-335 | 425-635 | |
| QSF* | 134 | | | | 1.07/3.34 |

*Starting material

Dynamic Mechanical Thermal Analysis (DMTA) was performed with TANIPU-3 in the rheometer to characterize the curing behavior. The storage modulus (G') and loss modulus (G") showed a crossover point at 140° C. and the loss modulus became higher than elastic modulus at around 147° C. which is considered to be the $T_g$ of the TANIPU-3. Another crossover point at around 200° C. showed that hardening of the adhesive started when this temperature was reached.

The shear strength of lap joint test specimens with thin bond line (close contact EN 302-1) was determined according to EN302-1.

TANIPU-2 to TANIPU-7 achieved shear strength values of 10 N/mm$^2$ as required by EN302-1 for the A1 load class. This measured strength exceeds the values of previously reported for VOC-free tannins-based adhesives. The only tannin-based adhesives that reached comparable strength values comprised aldehydes.

Maximum grafting level of carbonate groups on the tannin structure was achieved when the reaction to obtain the stage A precursor was carried out in a homogeneous phase of the DMC-tannin system. The use of the homogenous catalyst DBU facilitated the transesterification reaction by developing a high pH in the reaction mixture.

40-45% of phenolic OH groups have been converted to crosslinking sites with diamine for NIPU production.

The addition of hexamine in the manufacture of TANIPU-2 to TANIPU-7 improved the dry bond strength slightly over TANIPU-1. In the manufacture of TANIPU-3 a small percentage of propylene carbonate as curing accelerator was used which increased strength adhesion considerably thereby also meeting the requirement of load class A3 according to EN 302-3.

Shear strength tests were carried out on the standardized glued wood test specimens to determine the adhesive properties and with those of the Classification system for Wood adhesives (DIN EN 204) and was compared with reported data. The tested NIPU adhesives of the invention TANIPU- 1—TANIPU-7) performed better than any reported tannin-based NIPU adhesives that were synthesized with formaldehyde.

The invention claimed is:

1. A process for manufacturing a non-isocyanate polyurethane (NIPU) composition comprising:
   transesterification of a condensed tannin with a carbonate or a carbonate precursor followed by a reaction with a hardener selected from the group consisting of diamines, triamines, polyamines and mixtures thereof, wherein the process comprises:
   a. reacting the condensed tannin with a dialkyl carbonate or a precursor thereof at a temperature in a range from 20 to 40° C. for 1 to 12 h in a solvent selected from the group consisting of water, a $C_1$- to $C_6$ alkanol and a combination thereof in presence of a catalyst which is a Lewis base to obtain a reaction product,
   b. removing the solvent and drying the reaction product at a temperature in a range from 30 to 60° C. for 24 to 72 h to obtain a dried reaction product,
   c. mixing the dried reaction product obtained in b) with a hardener selected from the group consisting of diamines, triamines, polyamines er and mixtures thereof in an amount of 20 to 40 parts by weight of diamine, triamine or polyamine per 100 parts of dried reaction product of b) in an aqueous system at a temperature in a range from 35 to 70° C.,
   d. adjusting the pH of the system obtained in c) to at least pH 10 to obtain an alkaline reaction medium,
   e. thereafter increasing the temperature to 80 to 110° C. and keeping the alkaline reaction medium at this temperature for at least 30 to 90 min to obtain a viscous resin, and
   f. cooling the viscous resin obtained in e).

2. The process of claim 1, wherein, in a) the solvent is water or ethanol.

3. The process of claim 1, wherein an alkyl group in the dialkyl carbonate comprises 1 to 4 carbon atoms.

4. The process of claim 1, wherein the Lewis base is an amidine.

5. The process of claim 4 wherein the amidine is 1,8-diazabicyclo[5.4.0]undec-7-ene (DBU) or 1,5-Diazabicyclo (4.3.0)non-5-en (DBN).

6. The process of claim 1, wherein the hardener is an aliphatic diamine.

7. The process of claim 4, wherein the amidine is an annealed amidine.

8. The process of claim 6, wherein the aliphatic diamine has 2 to 8 carbon atoms.

* * * * *